United States Patent
Kasai

(10) Patent No.: US 7,418,340 B2
(45) Date of Patent: Aug. 26, 2008

(54) NAVIGATION DEVICE

(75) Inventor: Toshinori Kasai, Kariya (JP)

(73) Assignee: Denso Corporation, Kariya (JP)

( * ) Notice: Subject to any disclaimer, the term of this patent is extended or adjusted under 35 U.S.C. 154(b) by 672 days.

(21) Appl. No.: 10/960,420

(22) Filed: Oct. 7, 2004

(65) Prior Publication Data

US 2005/0080558 A1  Apr. 14, 2005

(30) Foreign Application Priority Data

Oct. 10, 2003  (JP)  ............................ 2003-352529

(51) Int. Cl.
*G01C 21/00* (2006.01)
*G08G 1/0969* (2006.01)

(52) U.S. Cl. ................. 701/209; 701/201; 701/211; 340/995.19

(58) Field of Classification Search ............. 701/201, 701/200, 208, 209, 211, 202, 204; 340/995.19, 340/995.23

See application file for complete search history.

(56) References Cited

U.S. PATENT DOCUMENTS

| 5,987,377 | A | * | 11/1999 | Westerlage et al. | ......... 701/204 |
| 6,256,577 | B1 | * | 7/2001 | Graunke | ................... 701/117 |
| 6,581,001 | B1 | * | 6/2003 | Katsuka et al. | .............. 701/209 |
| 6,922,629 | B2 | * | 7/2005 | Yoshikawa et al. | ........... 701/117 |
| 2003/0187573 | A1 | * | 10/2003 | Agnew et al. | ................ 701/201 |

FOREIGN PATENT DOCUMENTS

JP  5-216406  8/1993

* cited by examiner

*Primary Examiner*—Tan Q Nguyen
(74) *Attorney, Agent, or Firm*—Harness, Dickey & Pierce, PLC

(57) ABSTRACT

A navigation device preferentially indicates to a driver a certain route from among multiple candidates of guiding routes that guide the driver to a designated destination. By using the certain route, the driver is able to reach the destination earlier than a desired arrival time point with a minimum difference between the desired arrival time point and an estimated arrival time point. Further, the estimated arrival time point is determined to include a marginal time period compensating for a possible traveling delay.

17 Claims, 2 Drawing Sheets

NAVIGATION DEVICE

CROSS REFERENCE TO RELATED APPLICATIONS

This application is based on and incorporates herein by reference Japanese Patent Application No. 2003-352529 filed on Oct. 10, 2003.

FIELD OF THE INVENTION

The present invention relates to a navigation device that performs route guidance to a destination.

BACKGROUND OF THE INVENTION

A navigation device that performs route guidance (or routing assistance) to a destination retrieves the most proper route to the destination to thereby indicate the most proper route to a user when the user sets the destination. Further, a navigation device is proposed that indicates the shortest traveling-time route for avoiding a congested main road to select a short-traveling-time loophole path or alternative route (refer to JP-H5-216406 A).

However, from the inventor's viewpoint, the navigation device sometimes indicates the alternative route involving danger in traffic only because of the shorter traveling time to the arrival, even though the user can arrive at the destination by selecting the route including the main roads. In other words, a known route guidance is not performed based on a desired arrival time point.

SUMMARY OF THE INVENTION

The present invention has been made in consideration of the foregoing. It is therefore an object of the present invention to provide a navigation device that indicates a route by which a user arrives at a destination with the minimum difference between a desired arrival time point and an estimated arrival time point.

To achieve the above object, a navigation device is provided with the following. A desired arrival time point to the destination is obtained. A certain guiding route is preferentially indicated as a guiding route. The certain route guides a user to a destination with a smallest time difference between the desired arrival time point and an estimated arrival time point among candidates.

This structure enables a route guidance indicating a guiding route that has a minimal time difference between an estimated arrival time point and a desired arrival time point.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
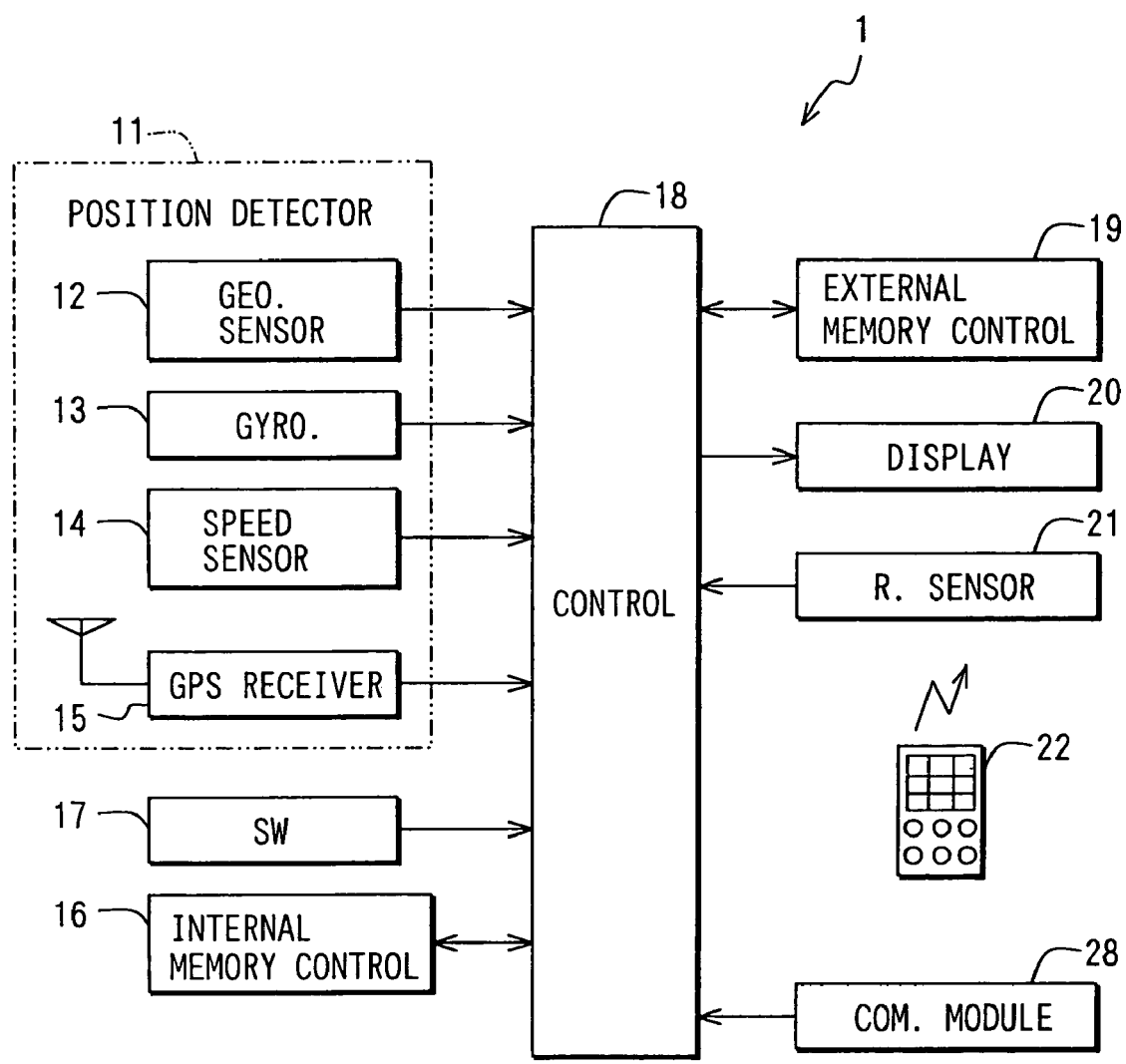
FIG. 1 is a block diagram showing a general structure of a navigation device according to an embodiment of the present invention.

FIG. 1 is a block diagram showing a general structure of a navigation device 1 according to an embodiment of the present invention. As shown in FIG. 1, the navigation device 1 includes a position detector 11, an internal memory control unit 16, a manipulation switch group 17, an external memory control unit 19, a display unit 20, a remote controller sensor 21, a communications module 28, and a control circuit 18 that interfaces the foregoing components.

The communications module 28 receives, from light beacons installed along roads, signals of VICS (Vehicle Information and Communication System) information including road congestion degrees, and outputs the received information as data to the control circuit 18. The communications module 28 accommodates transmitting and receiving units (not shown) and antennas (not shown) for an inter-vehicle communications and an Internet access via wireless communications. When a control signal for starting the inter-vehicle communications or the Internet access is inputted from the control circuit 18, the respective units are activated to start the inter-vehicle communications and the Internet access.

The display unit 20 includes a speaker and a screen such as a liquid crystal. The display unit 20 displays images on the screen based on image signals inputted by the control circuit 18, and outputs sounds through the speaker based on the sound signals inputted by the control circuit 18.

The manipulation switch group 17 is an input unit including mechanical switches and touch switches integrated and overlapped with the screen of the display unit 20. The manipulation switch group 17 outputs to the control circuit 18 signals based on pushing the mechanical switch (e.g., pushing a push button) or touching the touch panel.

The remote controller sensor 21 outputs to the control circuit 18 signals received from a remote controller 22 that transmits wireless signals such as infrared based on the manipulation by a user.

The position detector 11 includes well-known parts such as a geomagnetic sensor 12, a gyroscope 13, a vehicle speed sensor 14, and a GPS (Global Positioning System) receiver 15 to detect a vehicle position based on radio waves from satellites. Each of the sensors 12 to 15 outputs to the control circuit 18 information that is pertinent to its characteristic and specifies a current position. The position detector 11 can further include a steering rotation sensor and a driving-wheel sensor.

The internal memory control unit 16 includes a non-volatile memory medium such as an HDD (hard disk drive) to control reading and writing (if possible) with the memory medium based on control commands from the control circuit 18. Information stored in the memory medium includes so-called map-matching data for enhancing accuracy in the above position detection; various data including map data and landmark data; and a program for operating the navigation device 1. The map data includes loophole path (or alternative route) data for avoiding the congestion on main roads; road widths of links (parts of roads); traveling lengths (or distances) of links; link coefficients; the numbers of lanes; road kinds such as common roads or loophole paths; regulation speeds; traffic lights' locations; service areas' locations; and parking areas' locations.

The external memory control unit 19 controls reading and writing (if possible) with an external memory medium such as a DVD-ROM and a memory card. Information stored in the external memory medium includes additional information for adding to the map-matching data, the map data and landmark data, or the like.

The control circuit 18 is configured as an ordinary computer. The control circuit 18 contains a CPU, a ROM, a RAM, a flash memory, an I/O, and a bus line connecting the foregoing components. The control circuit 18 executes a program that is for operating the navigation device and which is retrieved from the ROM, internal memory control unit 16, or external memory control unit 19. While executing the program, the control circuit 18 performs reading of information from the ROM, RAM, or flash memory; writing of information on the RAM or flash memory; or exchanging of signals with the position detector 11, manipulation switch 17, external memory control unit 19, display unit 20, or remote controller 21 etc.

The CPU of the control circuit 18 reads a boot program, OS (Operating System), and the like from the ROM to execute them, and performs process management and hardware control based on the OS. The program that operates on the OS includes a menu program, and a route retrieving program.

While performing these programs, the CPU of the control circuit 18 computes a current position, when it is needed, based on the signals that are outputted from the sensors 12 to 15 included in the position detector 11 for specifying the current position.

Hereinbelow, operations executed by the CPU by executing the programs are explained as operations of the programs that are executed.

The menu program displays in a menu various programs operating on the OS, hierarchically with respect to a function or objective of the program. When the user selects one program from the displayed menu, the selected program starts its execution. The menu display is performed by outputting image data of the relevant menu on the display unit 20. Selection of the user is detected based on signals inputted to the control circuit 18 by the selection manipulation (e.g., cursor shift, pushing of determination button) to the remote controller 22 via the remote controller sensor 21 or to manipulation switch group 17.

The route retrieving program is started when the user selects it from the menu program. The route retrieving program accepts an input of a destination based on the manipulation of the remote controller 22 or the manipulation switch 17, and automatically selects the most appropriate route to the accepted destination from the current position to generate a guiding route and display it on the display unit 20. This method automatically selecting the most appropriate route includes the well-known Dijkstra method.

Figure 2:
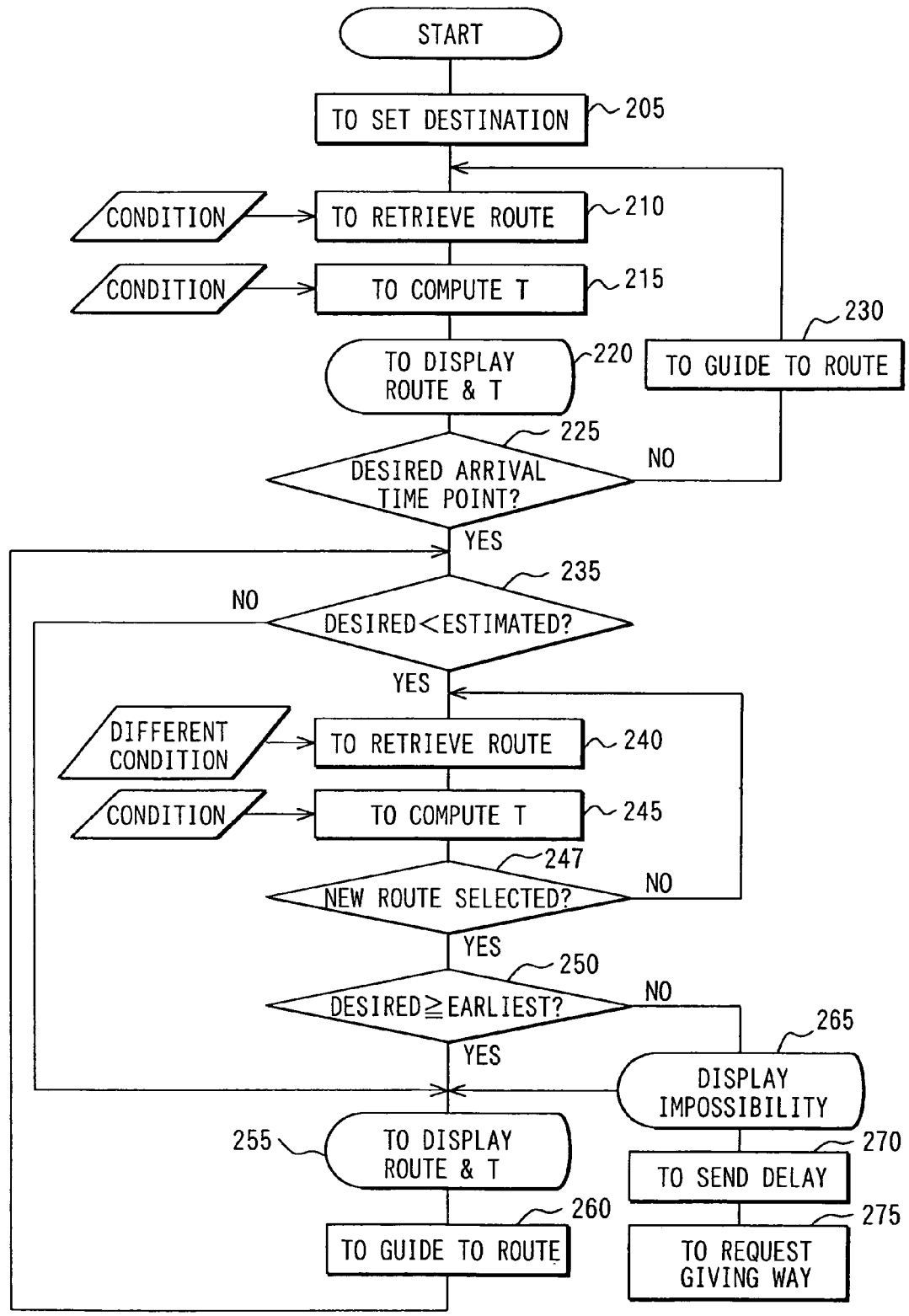
FIG. 2 is a flow chart diagram explaining a route retrieving program.

FIG. 2 shows a flow chart of the route retrieving program. Here, the route retrieving program reads from the map data included in the internal memory control unit 16 loophole path data; road widths of links; link traveling lengths (or link traveling distances); link coefficients; the numbers of lanes; road kinds such as common roads or loophole paths; regulation speeds; traffic lights' locations; service areas' locations; or parking areas' locations, when it is needed.

The route retrieving program sets a destination, first, at Step 205. In detail, the display unit 20 is caused to display a window for requesting an input of a destination such as coordinates or entity's name; then, the inputted destination is memorized in a given region of the RAM of the control circuit 18.

Next, at Step 210, a guiding route to the inputted destination is retrieved. The condition for retrieving includes "prioritizing a common road" or "prioritizing a road width."

The condition of "prioritizing a common road" means that the guiding route should include common roads as many as possible. That is, in the case that multiple candidates for the guiding route exist, a candidate including more common roads is prioritized over a candidate including more loophole paths or expressways. By contrast, the condition of "prioritizing a road width" means that the guiding route should include wide-width roads or many-lane roads as many as possible. That is, in the case that multiple candidates for the guiding route exist, a candidate including the most wide-width roads is prioritized over other roads.

The condition for retrieving, at Step 210, can be previously set by the user and memorized in the HDD in the internal memory control circuit 16. Otherwise, at Step 210, the display unit 20 can be caused to display a window for requesting the user to input the condition. Here, the condition inputted to the control circuit 18 by the manipulation of the remote controller 22 or manipulation switch group 17 can be used as the condition for retrieving at Step 210.

Next, at Step 215, an estimated arrival time point is computed with respect to the retrieved guiding route. The estimated arrival time point T is the sum of the earliest possible arrival time point T0 and a marginal time period α.

$$T=T0+\alpha$$

The earliest possible arrival time point T0 means an elapsed time period from the present time point to when the vehicle is to reach the destination using the retrieved guiding route, with the maximum regulation speed, without any stopping of traveling.

The earliest possible arrival time point T0 is shown as follows:

$$T0=\Sigma(\text{traveling length/regulation speed})$$

This means the total of "traveling length/regulation speed" with respect to each of the entire links included in the retrieved guiding route. This "traveling length/regulation speed" with respect to each of the links is a quotient the traveling length of a link divided by a regulation speed for the link. Here, the regulation speed can be replaced with a mean speed. Further, when this mean speed is based on the actual measurement, the accuracy of the earliest possible arrival time point T0 can be enhanced.

Further, the marginal time period a means a period that is prudently reserved for compensating for a potential traveling delay in using the retrieved guiding route, namely, a typical delay time period derived from a traveling advancing degree that is usually estimated in the retrieved guiding route, and is shown in the following formula:

$$\alpha=\{\Sigma(\text{road coefficient} \times \text{traveling length})\}+\{\beta\}$$

Here, the road coefficient is computed from the link coefficients of the links that constitute the road, while β is an addition value. The road coefficient has a unit of (time/distance) and is varied depending on a road kind or situation of the road etc., exhibiting a marginal time period with respect to a unit distance of the road.

In detail, suppose that a road coefficient K0 is assigned to a common road that has no traffic congestion. In this case, a road coefficient assigned to an expressway that has no traffic congestion is K0/10; a road coefficient assigned to an expressway that has traffic congestion is 10×K0; a road coefficient assigned to a common road that has traffic congestion is 50×K0; and a road coefficient assigned to a loophole path is 1.2×K0. That is, the road coefficient increases with increasing uncertainty of traveling time period through the road. As explained above, the road coefficient is affected by the congestion degree and road kind. Here, whether a road has traffic congestion is specified by congestion information inputted from the communications module 28.

Further, the addition value β is based on an additional status of the retrieved guiding route as follows: the number of rest facilities (e.g., parking areas, service areas) pertinent to the retrieved guiding route; the number of traffic lights within the retrieved guiding route; the number of turns crossing opposite lanes; a traveling time zone; a weather condition; or a traveling distance on an expressway. In detail, in the case that the number of parking areas within the guiding route is increased by one, one minute is added to a given value. In the case that the number of service areas pertinent to the retrieved guiding route is increased by one, three minutes are added to the given value. In the case that the number of traffic lights pertinent to the retrieved guiding route is increased by three, one minute is added to the given value. In the case that the number of turns crossing opposite lanes within the retrieved guiding route is increased by one, thirty seconds are added to the given value. Further, in the case that the traveling time zone includes lunch time hours (e.g., noon to one o'clock PM), thirty minutes are added to the given value. Furthermore, in the case that the retrieved guiding route includes an expressway of a given distance, e.g., 200 km or more, fifteen minutes are added to the given value.

An example of computation of thus obtained marginal time period a will be explained below. Suppose that a guiding route includes 30 km of common road, 2 km of loophole path, 253 km of expressway, 3 km of congestion portion within the expressway, 8 parking areas pertinent to the guiding route, 2 service areas pertinent to the guiding route, 30 traffic lights within the guiding route, and 10 turns within the guiding route, and that K0 is equal to 0.015 hour/km. The computation results in the following:

$$\begin{aligned}\alpha &= \{\text{``common road''} + \text{``loophole path''} + \text{``expressway''} + \\ &\quad \text{``congested expressway''}\} + \{\text{``parking area''} + \\ &\quad \text{``service area''} + \text{``traffic light''} + \text{``turn''} + \\ &\quad \text{``expressway} \geq 200 \text{ km''}\} \\ &= \{(30 \times 0.015) + (2 \times 1.2 \times 0.015) + (250 \times 0.015/10) + \\ &\quad (3 \times 50 \times 0.015)\} + \{(8 \times 1/60) + (2 \times 3/60) + \\ &\quad (30 \times 1/3 \times 1/60) + (10 \times 1/120) + (15/60)\} \\ &\cong 1.820 \text{ hour}\end{aligned}$$

Next, at Step 220 after the estimated arrival time point T is computed, the guiding route and the corresponding estimated arrival time point T are shown on the display unit 20. Further, an input window for a desired arrival time point is displayed on the display unit 20 so that the user can set the desired arrival time point, e.g., in the situation that the user wants to arrive at the destination earlier than the estimated arrival time point. The input window includes an input field and a determination button. When the user inputs a desired arrival time point in the input field by manipulating the manipulation switch group 17 or the remote controller 22 and pushes the determination button, the route retrieving program memorizes the time point inputted in the input field as a desired arrival time point in a given region in the RAM. Thus the user can set the desired arrival time point.

Next, at Step 225, it is determined whether a desired arrival time point is set. In detail, it is determined whether a desired arrival time point is memorized in the given region in the RAM of the control circuit 18. In the case that the desired arrival time point is set, the process advances to Step 235. Otherwise, the process advances to Step 230.

At Step 230, route guidance is performed. That is, based on the input from the position detector 11, the display unit 20 is caused to show a current position mark indicating the vehicle current position, map data read from the internal memory control unit 16 or external memory control unit 19, data including the guiding route retrieved at Step 210 to superimpose them with one another. The process then returns to Step 210. Here, at Step 210, when a new route that more appropriately meets with the route retrieving condition than the current guiding route does is found, the new route is selected as a new guiding route.

At Step 235 to which the process advances when the desired arrival time point is set, it is determined whether the set desired arrival time point is earlier than the estimated arrival time point, i.e., whether the user is to arrive later than the desired arrival time point. When the set desired arrival time point is determined to be not earlier than the estimated arrival time point, the process advances to Step 255. When the set desired arrival time point is determined to be earlier than the estimated arrival time point, (though it is not shown in FIG. 2 in detail), a new route is retrieved using processings similar to those at Steps 210, 215, for instance, by considering the initial condition of "prioritizing a common road." When new routes are retrieved that have estimated arrival time points being not later than the desired arrival time point, one of them that has an estimated arrival time point having the smallest difference with the desired arrival time point is selected. The process then advances to Step 255. By contrast, when no new route is retrieved that has an estimated arrival time point being not later than the desired arrival time point, the process advances to Step 240.

Next, at subsequent Steps 240, 245, 247, based on the above desired arrival time point, route retrieving is executed to anew retrieve a guiding route by using at least one priority setting of a given retrieving condition that is different from that at Step 210 and to be explained later in detail.

Here, first, by using the first priority setting of this given condition, a first-level route is preferentially selected as a new guiding route from among multiple candidates that can be selected; this first-level route has an estimated arrival time point that is not later than the desired arrival time point and which has the smallest time difference with the desired arrival time point among the multiple candidates.

Further, when there is no candidate as the first-level route (Step 247: NO), the process returns to Step 240 and is repeated by using the second priority setting of the given retrieving condition to retrieve the first-level route. In a case that the first-level route cannot be selected even when the entire priority settings (2nd, 3rd, . . . ) of the given retrieving condition are used, a second-level route is to be then retrieved by using the first priority setting of the given retrieving condition.

This second-level route is to have at least an earliest possible arrival time point being not later than the desired arrival time point and an estimated arrival time point that is later than the desired arrival time point but has the smallest time difference with the desired arrival time point.

Furthermore, in a case that the second-level route cannot be selected even when the entire priority settings (2nd, 3rd, . . . ) of the given retrieving condition are used, a third-level route is to be then retrieved by using the entire priority settings of the given retrieving condition.

This third-level route has an earliest possible arrival time point being later than the desired arrival time point and an estimated arrival time point that is also later than the desired arrival time point and has the smallest time difference with the desired arrival time point.

Here, in selecting the first-level, second-level, or third-level route, the smallest time difference with the desired arrival time point is checked. However, when there are a plurality of candidates that have approximately equal estimated arrival time points (that fall within a 10-minitue span difference), a candidate whose marginal time period is the minimum among the candidates can be preferably selected as a new route.

In the above processings, an estimated arrival time point along with an earliest possible arrival time point and a marginal time period is computed at Step 245 with respect to each of the candidates.

At Step 247, when any one of the first-level, second-level, and third-level routes is determined to be selected as a new guiding route, the process advances to Step 250.

At Step 250, it is determined whether the new guiding route has an earliest possible arrival time point that is equal to or earlier than the desired arrival time point. That is, when the third-level route is selected as the new guiding route, determination at Step 250 is negated, advancing the process to Step 265. By contrast, when the first-level or second-level route is selected as the new guiding route, determination at Step 250 is affirmed, advancing the process to Step 255.

The above-described priority settings of the given retrieving condition will be explained below. Suppose that the retrieving condition at Step 210 is "prioritizing a common road." Here, there is a case that a guiding route candidate includes an expressway as a part substituted for a part of the current guiding route.

In this case that a new guiding route is determined by substituting a new part for a replaced part of the current guiding route, the retrieving condition is related to, within the current guiding route, a position of the replaced part. In detail, the new guiding route is assigned to a candidate that has a substituted part that is closest to the destination, i.e., the farthest from the current position among the substituted parts of the multiple candidates.

That is, the above-described first priority setting of the given retrieving condition is to retrieve a candidate by replacing the part closest to the destination. For instance, the second priority setting is to retrieve a candidate by replacing a part next closest to the destination. Naturally, the subsequent lower (e.g., 3rd) priority setting is to retrieve a candidate by replacing a part that is relatively further from the destination, or closer to the current position than that by the higher (e.g., 2nd) priority setting.

As a result, the above retrieving condition enables, of the current guiding route of the initial prioritizing condition, a part closer to the current position to be maintained as long as possible by changing a part closer to the destination. Further, here, in practice, there are many cases where the substituted part of the new route has a lower road coefficient (or lower marginal time period a) than the replaced part of the current guiding route. Therefore, a marginal time period a of the new route is distributed to a portion relatively closer to the current position.

Since the marginal time period a is reserved for a potential traveling delay, a practical traveling time period may become shorter than an estimated traveling time period that having the initially estimated marginal time period. Therefore, it sometimes happens that a time period to a destination is eventually decreased to a desired one without any countermeasure while a driver continues to follow the current route without changing the route in a portion closer to the current position. This results in no necessity of substituting an expressway in a part of the route closer to the destination.

As a result, selecting the thus considered new route decreases a variation in the initial plan (using the condition of "prioritizing a common road") compared with selecting the other routes, thereby giving convenience or user-friendliness to a user of the navigation device 1.

At Step 255, similarly to at Step 220, the selected new guiding route and the corresponding estimated arrival time point are shown.

At Step 260, with respect to the new guiding route, in the same method as that at Step 230, the route guidance is executed. After Step 260, the process returns to Step 235.

At Step 265, the display unit 20 is caused to output, using the image or sound, notification that the vehicle cannot arrive by the desired arrival time point even without any delay in traveling. The process then advances to Step 255. Here, simultaneously, the process advances to child process at Steps 270, 275.

At Step 270, notification that the vehicle is to be delayed is sent to a registered recipient. In detail, a signal including the notification that a relevant vehicle cannot arrive at a destination by a scheduled time point is outputted to the communications module 28; further, a control signal is outputted to the communications module 28 so as to have the communications module 28 send the signal via the Internet to the registered recipient (e.g., email address).

At Step 275, notification for requesting that preceding vehicles should kindly give way to the relevant vehicle is sent to the peripheral vehicles. Further, this notification includes, as a delay degree of the relevant vehicle, a delay time period relative to a desired arrival time point. In detail, a signal including this notification is outputted to the communications module 28; further, a control signal is outputted to the communications module 28 so as to have the communications module 28 send the signal via the Inter-vehicle communications to the peripheral vehicles, especially to a preceding vehicle. Thus, the signal including the above notification is sent via the inter-vehicle communications. A user of the peripheral vehicle that has a function of the inter-vehicle communications can thereby recognize that a vehicle in a hurry is present nearby. Further, in this case, a sound output device (not shown) to an outside of the vehicle, or an outside indicator (not shown) such as a lump can be used for preferably notifying the preceding vehicle of information that the relevant vehicle is in a hurry and also of the above haste degree.

Here, the processing at Step 270 can be executed only once during the traveling for preventing the duplicated notifications. Further, when a route whose earliest possible arrival time point or estimated arrival time point is not later than the desired arrival time point is retrieved after the notification at Steps 270 is executed, another notification can be outputted for negating the preceding notification, for instance, at Step 255.

In the above-described route retrieving program, when a desired arrival time point is obtained at Step 225, a new guiding route is retrieved (Steps 240 to 260) only in the case that the desired arrival time point is earlier than an estimated arrival time point (Step 235: YES). In this case, the selected new guiding route should preferably have an estimated arrival time point that is earlier than the desired arrival time point and of which difference with the desired arrival time point is the smallest among those of the candidates.

Thus, the navigation device 1 can indicate a guiding route that minimizes a difference between an estimated arrival time point and a desired arrival time point. Changing the guiding route is performed only in the case that the desired arrival time point is earlier than the estimated arrival time point. Therefore, a route change that delays an estimated arrival time point to a later time point is not executed as long as the estimated arrival time point is earlier than the desired arrival time point. For instance, suppose that the vehicle traveling an expressway advances to the destination smoother than estimated, so that the estimated arrival time point becomes much earlier than the desired arrival time point. Even in this case, a route change is never executed that a part of the expressway is replaced with a common road.

Further, this estimated arrival time point is computed by adding, to the earliest possible arrival time point, a marginal time period. The marginal time period is prudently reserved for compensating for a potential traveling delay in using the relevant route; namely, the marginal time period is a typical delay time period derived from a traveling advancing degree that is usually estimated in the relevant route. Therefore, the route guidance can be performed based on the marginal time period pertinent to the guiding route.

Further, at Steps 270, 275, in the case that the guiding route cannot provide an earlier arrival time point than the desired arrival time point, the display unit 20 is caused to output notification that the vehicle cannot arrive at the desired arrival time point. Further, this notification is sent to a recipient outside of the vehicle, and a request for giving a traveling way to the vehicle is sent to a communications device mounted on a preceding vehicle by accompanied by information including a haste degree of the vehicle.

Thus, even when the vehicle is delayed from a scheduled time point, the delay information is sent to a registered recipient in advance, thereby relieving the sense of urgency of the user. Furthermore, it is possible that the peripheral vehicles may give the traveling way to the relevant vehicle by knowing the haste degree of the relevant vehicle. This results in decrease in traffic accidents due to unreasonable overtaking.

In the above explanation, "arrival time point" of the desired arrival time point, estimated arrival time point, earliest possible arrival time point includes an absolute time point, e.g., x hours y minutes, and a relative time point, e.g., z minutes later than the current time point.

It will be obvious to those skilled in the art that various changes may be made in the above-described embodiments of the present invention. However, the scope of the present invention should be determined by the following claims.

What is claimed is:

1. A navigation device indicating a guiding route that guides a user to a destination, the navigation device comprising:
    an obtaining unit that obtains, from the user, a desired arrival time point to the destination; and
    a guiding unit that preferentially indicates, as a guiding route, a certain route from among a plurality of candidates for the guiding route,
    wherein each of the candidates has
        an estimated arrival time point at which the user is estimated to arrive at the destination by using the each of the candidates and
        a time difference between the estimated arrival time point of the each of the candidates and the desired arrival time point obtained by the obtaining unit, and
    wherein the certain route has a time difference that is smallest among the time differences of the candidates.

2. The navigation device of claim 1,
    wherein the guiding unit preferentially indicates the certain route that has the time difference being smallest among the time differences of the candidates and an estimated arrival time point being earlier than the desired arrival time point obtained by the obtaining unit.

3. The navigation device of claim 1,
    wherein the estimated arrival time point of the each of the candidates includes a marginal time period that is prudently reserved for compensating for a potential traveling delay in using the each of the candidates.

4. The navigation device of claim 3,
    wherein the guiding unit specifies the marginal time period based on a traveling length of the each of the candidates and a road kind included in the each of the candidates.

5. The navigation device of claim 3,
    wherein the guiding unit specifies the marginal time period based on a traffic congestion degree of the each of the candidates.

6. The navigation device of claim 3,
    wherein the guiding unit specifies the marginal time period based on a time zone in which the user travels the each of the candidates.

7. The navigation device of claim 3,
    wherein the guiding unit specifies the marginal time period based on a number of traffic lights included in the each of the candidates.

8. The navigation device of claim 3,
    wherein the guiding unit specifies the marginal time period based on a number of turnings that is to cross opposite lanes in using the each of the candidates.

9. The navigation device of claim 3,
    wherein the guiding unit specifies the marginal time period based on a number of rest facilities pertinent to the each of the candidates.

10. The navigation device of claim 3,
    wherein the guiding unit specifies the marginal time period based on a weather condition in using the each of candidates.

11. The navigation device of claim 1,
    wherein, while the user travels the certain route, the guiding unit changes the guiding route so as to preferentially indicate, as an alternative guiding route from a current position to the destination, a given alternative route from among a plurality of alternative candidates for the alternative guiding route,
    wherein each of the alternative candidates has
        an alternative estimated arrival time point at which the user is estimated to arrive at the destination by using the each of the alternative candidates and
        an alternative time difference between the alternative estimated arrival time point of the each of the alternative candidates and the desired arrival time point obtained by the obtaining unit, and
    wherein the given alternative route has an alternative time difference that is smallest among the alternative time differences of the candidates.

12. The navigation device of claim 11,
    wherein the guiding unit changes the guiding route when, of the certain route, an estimated arrival time point from the current position to the destination is later than the desired arrival time point.

13. The navigation device of claim 11,
    wherein the each of the alternative candidates that includes a second portion that is to be substituted for a first portion included in the certain route,
    wherein each of the second portions of the alternative candidates includes a second marginal time period with respect to a unit of traveling length while the first portion includes a first marginal time period with respect to a unit of traveling length,
    wherein each of the first marginal time period and second marginal time period is prudently reserved for compensating for a potential traveling delay in using each of the first portion and the second portion, respectively,
    wherein the second marginal time period is smaller than the first marginal time period, and wherein the second portion of the given alternative route is located closest to the destination among the second portions of the alternate candidates.

14. The navigation device of claim 1,
wherein, when the user is estimated to arrive at the destination later than the desired arrival time point, the guiding unit causes a notifying unit to notify the user that the user is estimated to arrive at the destination later than the desired arrival time point.

15. The navigation device of claim 1,
wherein the navigation device is mounted in a vehicle, and
wherein, when the vehicle is estimated to arrive at the destination later than the desired arrival time point, the guiding unit notifies another vehicle that the vehicle is estimated to arrive at the destination later than the desired arrival time point.

16. The navigation device of claim 1,
wherein the navigation device is mounted in a vehicle, and
wherein, when the vehicle is estimated to arrive at the destination later than the desired arrival time point, the guiding unit outputs a notification that notifies a preceding vehicle that the vehicle wants the preceding vehicle to give a traveling way to the vehicle.

17. The navigation device of claim 16,
wherein the notification includes information of delay from the desired arrival time point of the vehicle.

* * * * *